United States Patent
Ren et al.

(10) Patent No.: US 10,929,462 B2
(45) Date of Patent: Feb. 23, 2021

(54) OBJECT RECOGNITION IN AUTONOMOUS VEHICLES

(71) Applicant: Futurewei Technologies, Inc., Plano, TX (US)

(72) Inventors: DaQi Ren, Saratoga, CA (US); Masood Mortazavi, San Jose, CA (US)

(73) Assignee: Futurewei Technologies, Inc., Plano, TX (US)

( * ) Notice: Subject to any disclaimer, the term of this patent is extended or adjusted under 35 U.S.C. 154(b) by 315 days.

(21) Appl. No.: 15/423,085

(22) Filed: Feb. 2, 2017

(65) Prior Publication Data

US 2018/0217607 A1 Aug. 2, 2018

(51) Int. Cl.
*G01C 22/00* (2006.01)
*G05D 1/00* (2006.01)
(Continued)

(52) U.S. Cl.
CPC ........ *G06F 16/5854* (2019.01); *G01S 13/931* (2013.01); *G06F 16/2379* (2019.01);
(Continued)

(58) Field of Classification Search
CPC ................ G05D 1/0246; G05D 1/0088; G06F 17/30259; G06F 17/30377; G06F 16/5854;
(Continued)

(56) References Cited

U.S. PATENT DOCUMENTS 6,629,104 B1 9/2003 Parulski et al.
7,065,716 B1 6/2006 Rzepkowski et al.
(Continued)

FOREIGN PATENT DOCUMENTS

CN 101351685 A 1/2009
CN 101641610 A 2/2010
(Continued)

OTHER PUBLICATIONS

"International Application Serial No. PCT/CN2018/074041, Internatonal Search Report dated Apr. 20, 2018", 4 pgs.
(Continued)

*Primary Examiner* — Mahmoud S Ismail
(74) *Attorney, Agent, or Firm* — Schwegman Lundberg & Woessner, P.A.

(57) ABSTRACT

A system for object recognition in an autonomous vehicle includes non-transitory memory storage for storing instructions and an image feature database. One or more processors are in communication with the memory. The one or more processors execute the instructions to download a road object database associated with routes between a departure point and a destination. Sensor data is received from a plurality of sensors of the autonomous vehicle and compared to data in the road object database. If the sensor data is not found in the road object database, the sensor data is compared to data in the image feature database. If the sensor data is not found in the image feature database, it is transmitted over a wireless channel to an Internet-coupled database. The sensor data is interpreted based on at least one of the road object database, the image feature database, or the Internet-coupled database.

20 Claims, 5 Drawing Sheets

(51) Int. Cl.

| | |
|---|---|
| *G06F 16/583* | (2019.01) |
| *G06K 9/68* | (2006.01) |
| *G01S 13/931* | (2020.01) |
| *G06F 16/23* | (2019.01) |
| *G06K 9/62* | (2006.01) |
| *G06K 9/00* | (2006.01) |
| *G06K 9/46* | (2006.01) |
| *G01S 13/86* | (2006.01) |
| *G01S 17/931* | (2020.01) |

(52) U.S. Cl.
CPC ........... *G06K 9/00791* (2013.01); *G06K 9/46* (2013.01); *G06K 9/6201* (2013.01); *G06K 9/6282* (2013.01); *G06K 9/68* (2013.01); *G01S 13/86* (2013.01); *G01S 13/865* (2013.01); *G01S 13/867* (2013.01); *G01S 17/931* (2020.01); *G01S 2013/93271* (2020.01); *G01S 2013/93275* (2020.01); *G06K 9/00201* (2013.01)

(58) Field of Classification Search
CPC .. G06F 16/2379; G01S 13/931; G01S 17/936; G01S 19/13; G01S 17/931; G01S 2013/93271; G01S 2013/93275; G01S 13/86; G01S 13/867; G01S 13/865; G01C 21/3691; G06K 9/68; G06K 9/6296; G06K 9/00805; G06K 2209/27; G06K 9/6201; G06K 9/00791; G06K 9/46; G06K 9/6282; G06K 9/00201; G06T 7/74; G06T 2207/10024; G06T 2207/30261; G06T 2207/10048; G06T 2207/30256

See application file for complete search history.

(56) References Cited

U.S. PATENT DOCUMENTS

| | | | |
|---|---|---|---|
| 7,162,053 B2 | 1/2007 | Camara et al. | |
| 7,421,125 B1 | 9/2008 | Rees | |
| 7,430,002 B2 | 9/2008 | Poplin | |
| 7,437,005 B2 | 10/2008 | Drucker et al. | |
| 7,580,952 B2 | 8/2009 | Logan et al. | |
| 7,639,841 B2* | 12/2009 | Zhu | G06K 9/00335 340/435 |
| 7,872,669 B2* | 1/2011 | Darrell | G06F 16/951 348/207.1 |
| 8,131,018 B2* | 3/2012 | Wilson | G06K 9/00818 348/154 |
| 8,195,394 B1* | 6/2012 | Zhu | G01C 21/26 382/107 |
| 8,611,585 B2* | 12/2013 | Zhang | G06K 9/00805 382/100 |
| 8,718,861 B1* | 5/2014 | Montemerlo | B60W 30/00 701/26 |
| 8,725,738 B1 | 5/2014 | High | |
| 8,855,849 B1 | 10/2014 | Ferguson et al. | |
| 9,026,303 B1* | 5/2015 | Ferguson | G05D 1/00 701/28 |
| 9,201,222 B2 | 12/2015 | Masuda et al. | |
| 9,201,421 B1* | 12/2015 | Fairfield | B60W 40/04 |
| 9,274,782 B2 | 3/2016 | Adderly et al. | |
| 9,285,805 B1* | 3/2016 | Pollock | G05D 1/0212 |
| 9,396,271 B2 | 7/2016 | Woodard et al. | |
| 9,476,970 B1* | 10/2016 | Fairfield | G06T 7/74 |
| 9,489,635 B1* | 11/2016 | Zhu | G06N 99/005 |
| 9,672,282 B2* | 6/2017 | Park | G06F 16/58 |
| 9,679,206 B1* | 6/2017 | Ferguson | G06K 9/00805 |
| 9,696,719 B2* | 7/2017 | Aviel | G05D 1/0088 |
| 9,709,985 B1* | 7/2017 | Silver | G05D 1/0088 |
| 9,709,986 B2* | 7/2017 | Gdalyahu | G05D 1/0088 |
| 9,760,090 B2* | 9/2017 | Shashua | G05D 1/0088 |
| 9,767,369 B2* | 9/2017 | Furman | G06K 9/00805 |
| 9,864,378 B1* | 1/2018 | Ferguson | G05D 1/0246 |
| 2002/0034330 A1 | 3/2002 | Lennon et al. | |
| 2002/0059296 A1* | 5/2002 | Hayashi | G01C 21/3676 |
| 2003/0039410 A1 | 2/2003 | Beeman | |
| 2005/0091232 A1 | 4/2005 | Eschbach et al. | |
| 2005/0162523 A1* | 7/2005 | Darrell | G06F 16/951 348/211.2 |
| 2005/0278390 A1 | 12/2005 | Kaler et al. | |
| 2006/0271594 A1 | 11/2006 | Haberman | |
| 2006/0288006 A1 | 12/2006 | Eschbach et al. | |
| 2007/0005571 A1 | 1/2007 | Brewer et al. | |
| 2007/0201767 A1 | 8/2007 | Fujita | |
| 2007/0288432 A1 | 12/2007 | Weltman et al. | |
| 2008/0082497 A1 | 4/2008 | Leblang et al. | |
| 2008/0104099 A1 | 5/2008 | Walczak et al. | |
| 2008/0120322 A1 | 5/2008 | Liu et al. | |
| 2008/0162450 A1 | 7/2008 | McIntyre et al. | |
| 2008/0162469 A1 | 7/2008 | Terayoko et al. | |
| 2008/0230705 A1 | 9/2008 | Rousso et al. | |
| 2009/0138198 A1* | 5/2009 | Lee | G06F 16/29 701/469 |
| 2009/0148068 A1 | 6/2009 | Woodbeck | |
| 2009/0164462 A1 | 6/2009 | Snijder | |
| 2010/0049740 A1 | 2/2010 | Iwase et al. | |
| 2011/0112753 A1* | 5/2011 | Yamane | G01C 21/3492 701/532 |
| 2011/0244919 A1* | 10/2011 | Aller | G06K 9/00973 455/556.1 |
| 2012/0310516 A1* | 12/2012 | Zeng | G01C 21/32 701/300 |
| 2013/0050405 A1 | 2/2013 | Masuda et al. | |
| 2015/0110344 A1 | 4/2015 | Okumura | |
| 2015/0169773 A1 | 6/2015 | Woodard et al. | |
| 2015/0202962 A1* | 7/2015 | Habashima | B60K 35/00 345/633 |
| 2015/0253141 A1* | 9/2015 | Kesting | G01C 21/32 701/409 |
| 2015/0266455 A1* | 9/2015 | Wilson | G09B 19/10 701/93 |
| 2015/0355640 A1 | 12/2015 | Ferguson et al. | |
| 2016/0028824 A1* | 1/2016 | Stenneth | B60Q 9/008 709/219 |
| 2016/0061612 A1 | 3/2016 | You et al. | |
| 2016/0147045 A1 | 5/2016 | Masuda et al. | |
| 2016/0170414 A1* | 6/2016 | Chen | G05D 1/0088 701/27 |
| 2016/0283804 A1* | 9/2016 | Furman | G06K 9/00805 |
| 2017/0010106 A1* | 1/2017 | Shashua | G01C 21/32 |
| 2017/0309072 A1* | 10/2017 | Li | G06T 19/006 |

FOREIGN PATENT DOCUMENTS

| | | |
|---|---|---|
| CN | 102208035 A | 10/2011 |
| CN | 102460074 A | 5/2012 |
| CN | 102596517 A | 7/2012 |
| CN | 102656532 A | 9/2012 |
| CN | 105210128 A | 12/2015 |
| CN | 105674993 A | 6/2016 |
| CN | 105741595 A | 7/2016 |
| CN | 105759295 A | 7/2016 |
| CN | 105865419 A | 8/2016 |
| CN | 105929823 A | 9/2016 |

OTHER PUBLICATIONS

"International Application Serial No. PCT/CN2018/074041, Written Opinion dated Apr. 20, 2018", 4 pgs.
"Chinese Application No. 201880001084.7, First Office Action dated Dec. 11, 2019", (Dec. 11, 2019), 25 pgs.
"Chinese Application No. 201880001084.7, Chinese Search Report dated Nov. 4, 2020", (Nov. 11, 2020), 4 pgs.

* cited by examiner

OBJECT RECOGNITION IN AUTONOMOUS VEHICLES

FIELD OF THE INVENTION

The present disclosure is related to autonomous vehicles, and in particular to information recognition in autonomous cars.

BACKGROUND

As autonomous vehicles are being developed for operation on public roads, the vehicles need to be able to identify objects in order to know if the vehicle should avoid the object, stop the vehicle, or ignore the object. Since some vehicles may be operating at relatively high speeds, the identification of the object should be relatively quick.

Typically, an autonomous vehicle extracts feature points from an image to generate a feature point descriptor. These extracted feature points can then be compared to the feature points of a database of known objects. This method can be time consuming and inefficient when using a database containing large numbers of feature point descriptors to search.

SUMMARY

Various examples are now described to introduce a selection of concepts in a simplified form that are further described below in the detailed description. The Summary is not intended to identify key or essential features of the claimed subject matter, nor is it intended to be used to limit the scope of the claimed subject matter.

A first example is a system for object recognition in an autonomous vehicle. The system includes non-transitory memory storage comprising instructions and an image feature database and one or more processors in communication with the memory. The one or more processors execute the instructions to: download a road object database associated with routes between a departure point and a destination; receive sensor data from a plurality of sensors of the autonomous vehicle; compare the sensor data to data in the road object database; if the sensor data is not found in the road object database, compare the sensor data to data in the image feature database; if the sensor data is not found in the image feature database, transmit the sensor data over a wireless channel to an Internet-coupled database; interpret the sensor data based on at least one of the road object database, the image feature database, or the Internet-coupled database; and implement the interpretation with the autonomous vehicle.

A second example is a computer-implemented method for recognizing road objects by an autonomous vehicle. The method includes downloading a road object database associated with routes between a departure point and a destination. Sensor data is received from a plurality of sensors of the autonomous vehicle. The sensor data is compared to data in one of the road object database, the image feature database, or an Internet-coupled database, wherein the sensor data is compared to the data in each database in an order of the road object database, the image feature database, and the Internet-coupled database. The sensor data is interpreted based on at least one of the road object database, the image feature database, or the Internet-coupled database. The interpretation is implemented with the autonomous vehicle.

A third example is a graph-based method for object recognition in an autonomous vehicle. The method includes generating a static database and a streaming database, the static database comprising reference fixed road objects with associated metadata for routes between an origin and a destination for the autonomous vehicle, the streaming database comprising sensor data, collected from vehicle sensors, and associated metadata. Objects are categorized in the static database between fixed objects and temporary objects. The streaming database is updated based on objects from the sensor streaming data as the vehicle moves. A time and location is associated with the objects from the sensor streaming data. The streaming database is compared to the static database to identify the objects from the sensor streaming data.

DETAILED DESCRIPTION

Autonomous vehicle systems use some form of image recognition to determine that the vehicle is on the road, in the proper lane, and avoids obstacles. Conventional methods include using imaging devices (e.g., cameras) to capture images of the road and surrounding objects. Feature points are then extracted from the image. The feature points may include shapes, lines, edges, corners, and angles. The feature points are then used to search a database of image feature points to attempt to determine a match with the imaged feature points. The results from this search may then be used to determine the object in the image. This process is inefficient and time consuming due to the processor-intensive searching for particular feature points. The amount of time to perform the process may result in dangerous situations at highway speeds where rapid identification of objects is necessary to maintain a safe speed.

Using continuously captured images, the disclosed embodiments perform a continuous real-time streaming search of a pre-loaded road database associated with a route. A road object database generally containing a limited number of objects to recognize that are associated only with the possible routes between the departure point and the destination, is downloaded prior to each trip. Thus, the database searching is performed more quickly on a much smaller database than conventional databases. If an image cannot be found in the pre-loaded road object database, a conventional feature point database may be accessed to find the object. If the image is also not found in the conventional feature point database, the image may be transmitted to an Internet-based database for searching.

Figure 1:
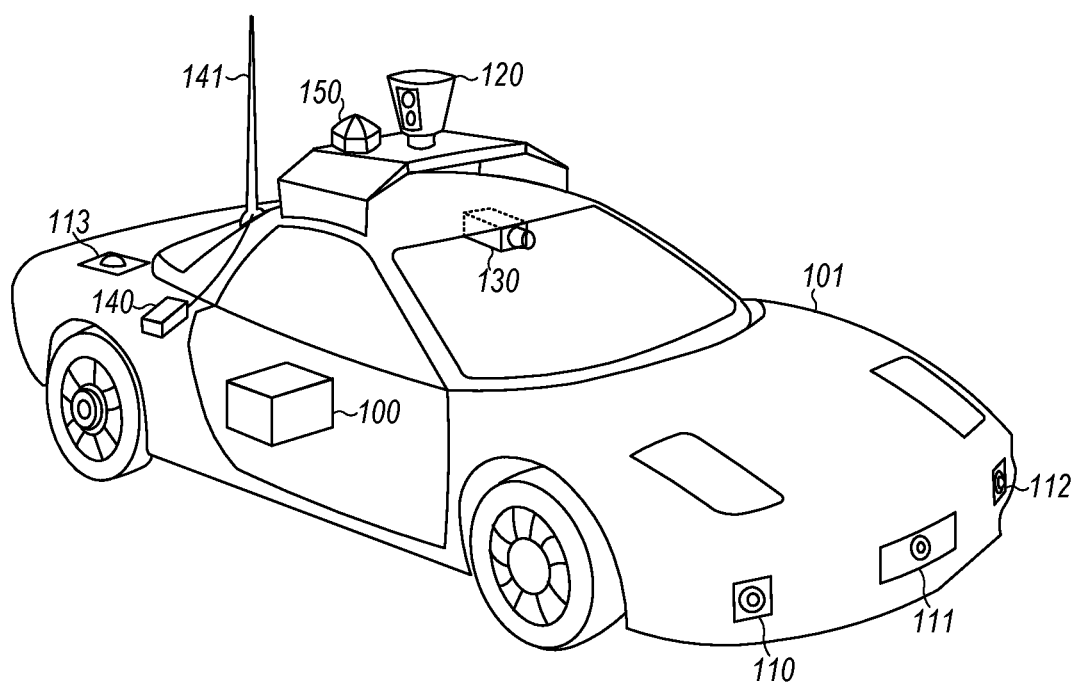
FIG. 1 is a diagram of an autonomous vehicle system, according to an example embodiment.

FIG. 1 is a diagram of an autonomous vehicle system, according to an example embodiment. The elements of the system of FIG. 1 are for purposes of illustration only as other systems that include additional or fewer components may be used in executing any methods disclosed herein. A more detailed description of one implementation of this system is discussed subsequently with reference to FIG. 4.

A vehicle 101 may be an automobile having the capability to operate on public roads and highways with or without a driver present. The autonomous vehicle system may assist the driver or it may completely control the vehicle 101 without any driver intervention. The vehicle 101 includes an internal combustion engine, an electric motor, or both to provide locomotive power. The steering capability may be through mechanical gearing and linkage assisted by servos or completely by servo control as controlled by a controller 100.

Figure 4:
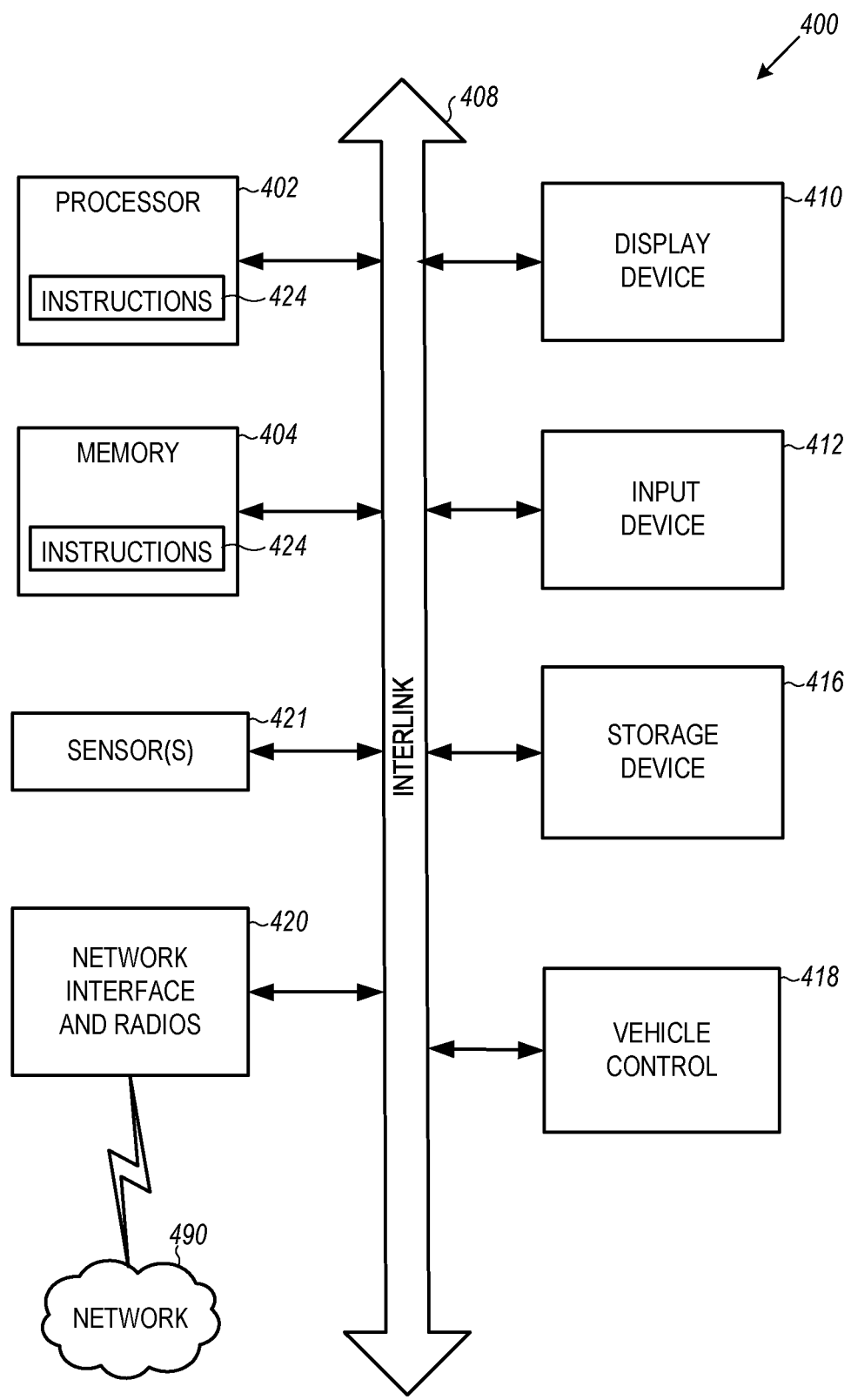
FIG. 4 is a block diagram illustrating an autonomous vehicle computer system including clients, servers, and cloud based resources for implementing algorithms and performing methods, according to example embodiments.

The system may comprise the controller 100 that includes processors and memory as shown in FIG. 4. The controller 100 may be configured to execute any methods described herein. All of the other components of the system are coupled to the controller 100 in some manner so that they are controlled and/or monitored by the controller 100.

A plurality of radar sensors 110, 111, 112, 113 are distributed throughout the exterior of the vehicle 101. For example, a subset of the plurality of radar sensors 110-112 are coupled to the front of the vehicle 101 to locate objects in front of the vehicle 101. One or more other radar sensors 113 may be located on the back of the vehicle 101 to locate objects behind the vehicle for when the vehicle backs up. While not shown for purposes of clarity, other radar sensors may be located on the sides of the vehicle 101 to locate objects such as other vehicles approaching the vehicle 101 from the side.

A light detection and ranging (LIDAR) sensor 120 may be mounted on the vehicle 101 as shown by mounting the LIDAR sensor 120 in a spinning structure mounted to the top of the vehicle. The spinning LIDAR sensor 120 may then be able to transmit the light signal in a 360° pattern around the vehicle to continuously map all objects surrounding the vehicle as it moves.

An imaging sensor 130 such as a camera, video camera, or other similar imagine collection sensor may be mounted on the vehicle to capture images as the vehicle moves. For purposes of illustration, the imaging sensor 130 is shown in the front of the vehicle 101 but other embodiments may locate a plurality of imaging sensors 130 around all sides of the vehicle 101 to capture images in a 360 pattern around the vehicle 101. The imagining sensor 130 may capture not only visible spectrum images but infrared spectrum images as well.

A radio 140 coupled to antenna 141 may be located in the vehicle 101 to provide wireless communication for the system. The radio 140 is configured to operate over any wireless communication technique or wireless standard including, but not limited to, Wi-Fi (IEEE 802.11), cellular (e.g., Global System for Mobile communication (GSM), code division multiple access (CDMA), time division multiple access (TDMA)), Bluetooth®, and/or Long Term Evolution (LTE). The radio 140 may include multiple radios so that the controller 100 may communicate over wireless channels using multiple radio techniques.

A global positioning system (GPS) sensor 150 may be located on the vehicle 101 to provide geographical coordinates to the controller 100 regarding the location of the vehicle 101 as well as the time that the coordinates were generated. The GPS 150 includes both the antenna for receiving the GPS satellite signals as well as the GPS receiver coupled to the antenna. For example, when an object is observed in an image or by another sensor, the GPS 150 may provide the geographical coordinates and time of the discovery.

Figure 2:
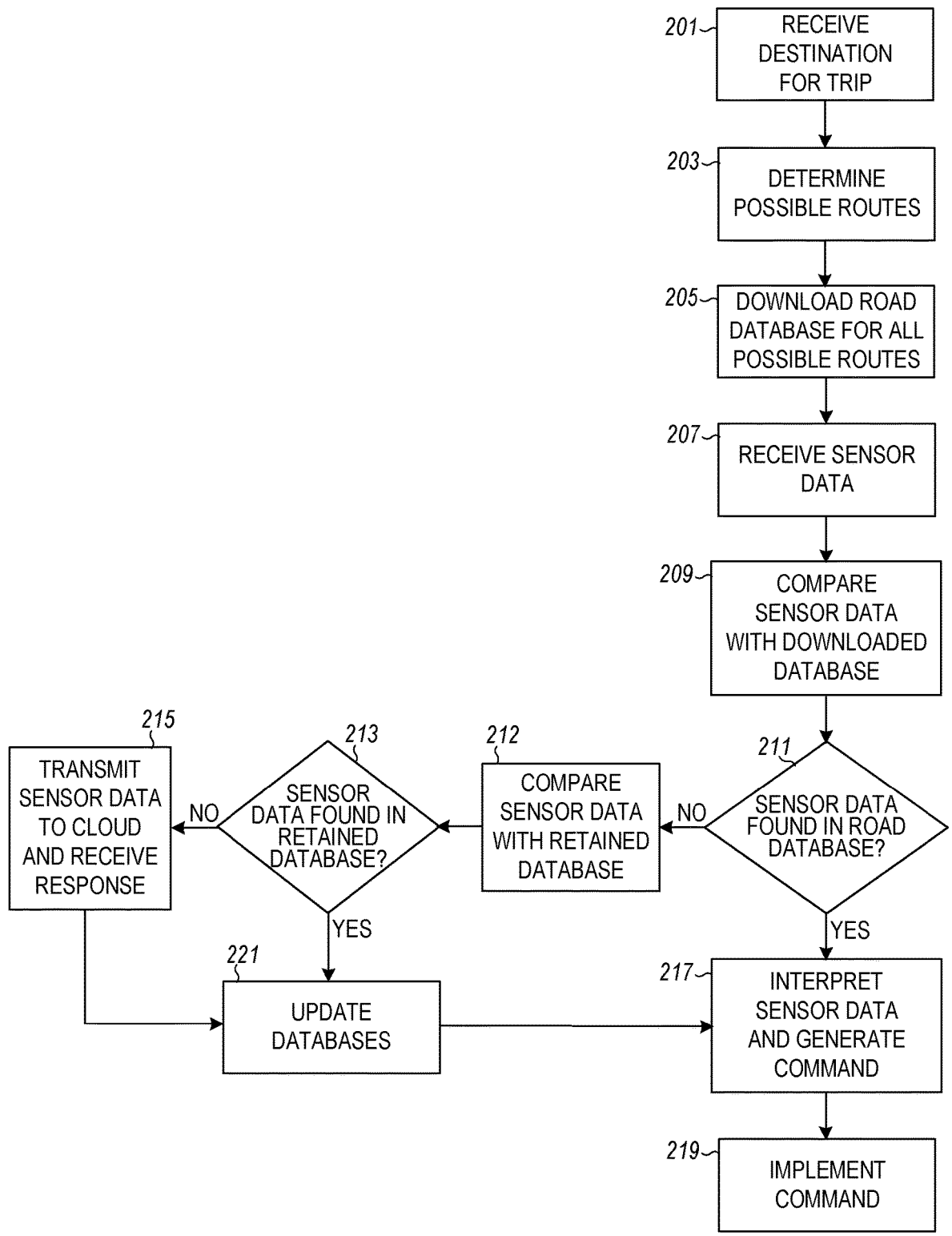
FIG. 2 is a flowchart of a method for recognizing road objects with an autonomous vehicle, according to an example embodiment.

FIG. 2 is a flowchart of a method for recognizing road objects with an autonomous vehicle, according to an example embodiment. The method first receives a destination for the trip in block 201. The current location of the vehicle is also determined at this time and is set as the departure point for the trip. The destination may be input by the user/passenger.

In block 203, the controller 100 determines all possible and reasonable routes from the departure point to the destination. For example, a user may set user preferences to instruct the controller 100 to avoid highway travel. The user may also set preferences to instruct the controller 100 to use as much highway travel as possible to reach the destination faster. Using the radios 140 in the vehicle 101, the controller 100 may access Internet sites for traffic, weather reports, and/or closed roads for various routes in order to determine the most efficient route or to find routes that are closed due to construction or natural disasters. Thus, when determining the possible routes from the departure point to the destination, the controller 100 may weight certain routes differently based on user preferences, traffic, construction, natural disasters, and/or weather.

In block 205, the controller 100 downloads a road object database associated with all of the just determined routes. The road object database includes the geographical coordinates for fixed objects such as roads, intersections, buildings, and other fixed objects along each of the routes between the departure point and the destination.

The road object database is preloaded and stored in temporary memory (e.g., random access memory (RAM)) prior to each trip since it may vary for each trip depending on the selected routes. Each object in the road object database may include an object identification (e.g., object number), an object name (e.g., shopping center, office building), a street address, a geographical coordinate (e.g., latitude and longitude), and an image. The image may take the form of a plurality of images showing different image angles and different seasons since snow and ice may change the image somewhat.

For purposes of comparison, another relatively larger database is stored in the vehicle in permanent memory (e.g., flash, optical disks, magnetic disks) and does not normally change for each trip. This database may be referred to as an image feature database or retained database. This is a general database that is stored in the autonomous vehicle memory and is not dedicated to any one particular route like the road object database.

In block 207, the controller 100 receives and collects all of the sensor data for that particular point in time and geographical location. For example, the controller 100 may access the image sensor(s) 130, the radar sensors 110-113, the LIDAR 120, or any other sensor data that is associated with a geographical location as determined by the GPS 150.

In block 209, the sensor data is compared to the downloaded road object database. Since the downloaded road object database is smaller and does not rely on extracting features from the images, this search may be substantially faster as compared to a conventional feature extraction/feature search method. Since the vehicle is probably moving and continuously collecting sensor data, such as continuous images, the downloaded road object database search of block 209 may be referred to as a stream querying of the database as illustrated in FIG. 3.

Figure 3:
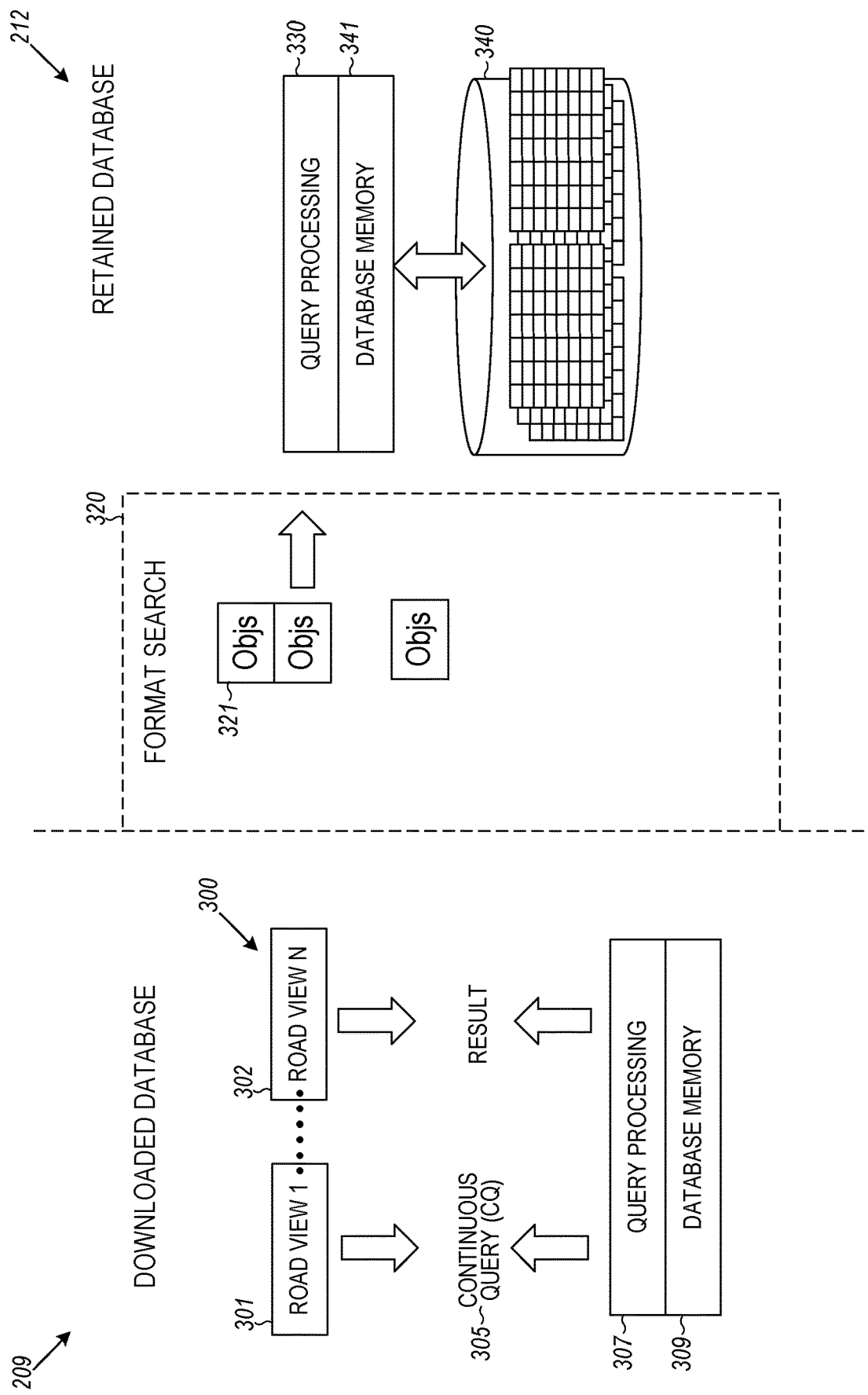
FIG. 3 is a diagram of a method for performing searches of different databases, according to an example embodiment.

FIG. 3 is a diagram of a method for performing searches of different databases, according to an example embodiment. The stream querying continuously collects a stream of road views 300 (e.g., road view 1-N) 301-302 and performs a continuous query of the database memory 309. These road views 301-302 include not only images but other sensor data as well (e.g., radar, LIDAR, visible image, infrared image).

The road views 301-302 are used in continuous querying 305 such that as each road view 301-302 is collected, it is input into the query processing 307. The query processing 307 may perform any formatting necessary to access the downloaded road object database memory 309. For example, the geographical location and street address may be extracted from the sensor data and used to search the database 309 for the stored images. The collected image may then be compared to the stored images for that particular location to determine if they are in the database 309.

Referring again to FIG. 2, if a road view 301, 302 is found in block 211, the process proceeds to block 217 where the sensor data is interpreted and a vehicle command is generated (e.g., slow, stop, accelerate, turn left or right). Since the downloaded road object database includes fixed objects, objects that dynamically change (e.g., people, other vehicles, animals) may not be found in the downloaded road object database. Thus, if the sensor data was not found in the downloaded road object database in block 211, in block 212 the method searches the retained image feature database stored in the vehicle memory that is not normally updated prior to every trip. The retained image feature database search is illustrated in greater detail with reference to FIG. 3.

The search of the image feature database begins with the formatting of the search request 320. For example, the search request may take the form of a plurality of objects 321.

Generating each object may include extracting features from the sensor data. For example, the features may include lines of images, angles, openings, shapes, colors, textures, or combinations of these. These features are formatted into the objects 321 that are input to the query processing 330. The query processing 330 may format the query into any format necessary to search the retained image feature database.

The retained image feature database is normally stored long-term on a drive 340. The drive may take the form of a hard disk drive (HDD) (e.g., magnetic drive), an optical drive, a tape drive, a solid state drive (SSD), or any combination of these technologies. Data regarding the current route may be temporarily loaded into main memory 341 for faster searching.

Referring again to FIG. 2, if the sensor data is not found in the image feature database, in block 213, the sensor data is transmitted to the cloud (e.g., Internet-based server) for a more powerful search. The sensor data may then be used to access a database that may encompass performing an Internet search using an Internet search engine. The Internet search results are received by the vehicle.

When any of the above-described searches 209, 212, 215 have successfully found a match for the object in the sensor data, the search results may be used, in block 221, to update one or more of the databases that did not contain the object. Thus, any future searches for that particular object will be successful. The method then returns to block 217 for interpretation.

If none the searches return a match, a decision tree will be applied to the unknown object. First, a decision needs to be made to judge if the unknown object is important to the driver for safety reasons. If the object is something that is unknown but is not on the road or appearing to approach the road, it can be ignored by the driver. The autonomous vehicle can continue driving and the image of the unknown object will then be kept in the record for further study by machine or by humans.

If the unknown object appears on the road, the traffic signs or any other important places that is important to safety of the vehicle, the autonomous vehicle can take emergency action to avoid the object including avoiding the object or stopping at a safe place. A request for assistance may be sent to the management center.

Block 217 also generates an operational decision and command based on the search results. For example, the searches results may continuously indicate the existence of road lines and the type of road lines (e.g., dashed, yellow, white). The interpretation block 217 may use the type of line to determine that it is necessary to generate a command to steer the vehicle within the lines, to steer the vehicle across a dashed line to change lanes (depending on destination or other vehicles in the present lane as found by the sensor data), or to steer the vehicle to an exit ramp or turn.

In another example, the search results may have determined that the object in the road is an image of a person and that the person is relatively close to the vehicle (as determined by radar or LIDAR sensor data). The interpretation block 217 may generate the command to stop the vehicle or drive around the person.

In block 219, the command generated by block 217 is implemented. For example, if a stop command is generated, the vehicle is commanded to apply the brakes. If a directional movement command is generated, the vehicle is commanded to turn in the commanded direction.

FIG. 4 is a block diagram illustrating an autonomous vehicle computer system 400 including clients, servers, and cloud based resources for implementing algorithms and performing methods, according to example embodiments. This block diagram is for purposes of illustration only as other systems may have a different architecture and still be able to implement any methods disclosed herein.

The autonomous vehicle computer system 400 may include a processor unit 402 (e.g., a central processing unit (CPU), a graphics processing unit (GPU), a processor core, or any combination thereof), and memory 404. The processor unit 402 may include one or more processors. The various elements of the vehicle may communicate with each other over an interlink (i.e., bus) 408. The combination of the processor 402 and the memory 404 may also be referred to as a computer to execute any methods disclosed herein.

The memory 404 may include at least one non-transitory computer-readable medium on which is stored one or more sets of data structures or instructions 424 (e.g., software, firmware) embodying or utilized by any one or more of the techniques, methods, or functions described herein. The instructions 424 may also reside, at least partially, in additional computer-readable memories such as within the processor 402 during execution of the methods.

One or any combination of the processor 402, the memory 404 or the storage device 416 may constitute non-transitory computer-readable media. The software, when executed by the underlying hardware of the device, causes the hardware to perform the specified operations of the methods described herein.

The memory 404 may include volatile memory and/or non-volatile memory. For example, the memory 404 may include one or more of random access memory (RAM), read only memory (ROM), erasable programmable read-only memory (EPROM) and electrically erasable programmable read-only memory (EEPROM), flash memory or other memory technologies. The storage device 416 may include solid state disks (SSD), magnetic disks, optical disks, or any other form of mass storage memory.

The autonomous vehicle computer system 400 may further include a display unit 410 and an alphanumeric input device 412 (e.g., a keypad, keyboard) coupled to the bus 408. In an example, the display unit 410 and the input device 412 together may be a touchscreen display.

The autonomous vehicle computer system 400 may additionally include a vehicle control block 418. The vehicle control block 418 generates the necessary signals and control, based on the methods described herein, to control the various mechanical systems of the autonomous vehicle.

One or more sensors 421 may include position, image, and movement sensors such as accelerometers, compasses, gyroscopes, altimeters, barometers, thermometers, vertical speed sensors, radar, LIDAR, and/or GPS receivers. The sensors 421 may additionally include imaging sensors to generate frames of images. Each frame comprising a plurality of pixels (e.g., picture elements).

A network interface and radios 420 may include any necessary circuits for communicating over a wireless or wireline channel. For example, the network interface and radios 420 may include one or more radio frequency (RF) transmitters and/or receivers (i.e., radios) with appropriate antennas.

The network 490 may be a Wi-Fi network, a cellular network, a peer-to-peer network, a local area network (LAN), or a wide area network (WAN) including the Internet. The autonomous vehicle computer system is designed with continuous backup of the flow of data to the memory 404 within a single system facility. Since the streaming data is stored in memory, the disclosed system is capable of rewinding the reference stream if necessary to review data.

Figure 5:
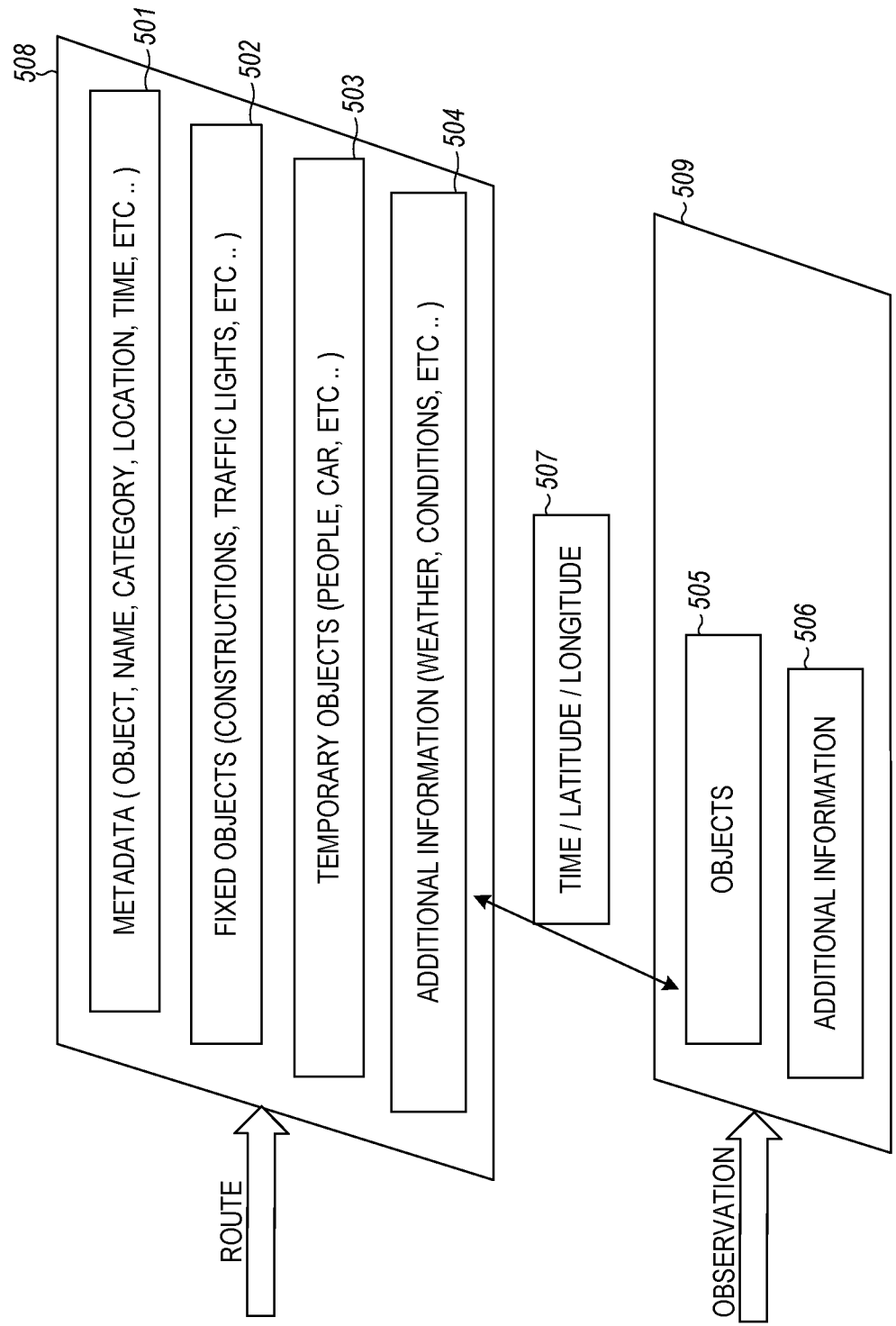
FIG. 5 is a diagram of a data stream schema, according to an example embodiment.

FIG. 5 is a diagram of a data stream schema, according to an example embodiment. The data stream schema is illustrated by a snapshot of logical schema of the streaming data that is part of a graph-based method for recognizing road objects by an autonomous vehicle. The graph-based concept is based on the databases using the geographical coordinates of the object as well as the time the data was collected in identification of the objects.

Blocks 501-504 represent the contents in the reference database 508 (e.g., static database) for the selected route. Blocks 505-506 represent the streaming database 509 captured by the car sensors including radar and cameras. Block 507 represents the time and location (e.g., geographical coordinates, latitude, longitude) of the snapshot of streaming data.

This snapshot of a streaming data and static data corresponds to what the car continuously captures from road activities along the selected route. The snapshot also includes user metadata such as object images with associated locations and times that the data was collected. The details of this schema is described below.

The design of the graph-based data schema includes two categories (i.e., streaming data, static data). Static data 501 corresponds to what the user continuously generates from the camera on the car. The static data 501 may be referred to as metadata that includes objects detected in the camera images, object name and profile, object category, object location and time of image capture. The metadata 501 may further include user profiles, street maps, street view data, etc.

Fixed objects 502 in the reference database include construction (e.g., road condition) and its location, buildings and their location, traffic light locations, etc. These objects do not change often in the reference database 508.

The temporary objects 503 represents the objects temporarily appearing on the road as detected by the cameras, including people, cars, animals, etc. These objects may change with time and, thus, the corresponding temporary objects data in the reference database 508 updates relatively often. The objects and their associated attributes (e.g., time, location) provide information for discovering street target changes, updates, etc.

Additional Information 504 includes weather, road conditions, events taking place involving the selected route, etc. The additional information may also change. However, this information 504 is related to seasons and historical records. The reference database 508 can include the historical information for the specific location, in order to provide useful information for the autonomous vehicle to drive.

Streaming database 509 is updated (e.g., collected) frequently. It contains various sources of streaming data. The sensor streaming data includes objects 505 that are observed on the road and the additional information 506 such as weather and road conditions. As observed objects come into view of the vehicle's sensors, the object can be inserted into the streaming database.

The streaming data from the sensors are configured as the data is collected with a constant but relatively fast rate. The streaming data may transfer in a range of 1 Megabits per second (Mbps) up to 12 Terabits per second (Tbps). The streaming data of objects may be at different rates of input elements per second. This rate may be configurable to match the reference data stream. The agreement on the results between the streams is by simply comparing whether they return the same elements.

The streaming database 509 queries between observed objects 505 and reference objects in reference database 508 on the selected route are performed based on time and location 507. The time and location data 507 are used to synchronize the data stream and make sure the objects are being compared in the database at the same time and location in order to take into account different sun angles and seasonal changes. The objects from the sensor data may be observed by multiple sensors besides the camera. For example, radar, LIDAR, or any other sensor may be used. In an embodiment, every comparison that is performed by the system may be performed from the data of multiple sensors. The sensing may return duplicates for simple queries or for complicated objects. Interpreting these mismatches, the processor is triggered to update new objects when it is determined that a new object has appeared and is not found in the static database 508. Also, using comparisons, temporary objects will be ignored and will not be updated if a newly sensed object is found in the static database 508.

The streaming database may be compared to the static database to identify objects from the sensor streaming data. The identified objects may then be either ignored or acted on by the autonomous vehicle control based on the identity of the object and its location relative to the road.

In some embodiments, some observed object data sequences from the sensor streaming data may have a different object data sequence length than a corresponding reference fixed road object data sequence. For example, new road construction on a known road may cause this. When this occurs, the associated time and location are used to identify any regions of similarity between the observed object data sequence and the reference fixed road object data sequence. The time and location information are used to align the sequences. Differences are determined between the observed object data sequence and the reference fixed road object data sequence. The static database is updated based on the differences between the observed object data sequence and the reference road object data sequence.

In the previous description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software in one embodiment. The software may consist of computer executable instructions stored on computer readable media or computer readable storage device such as one or more non-transitory memories or other type of hardware based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

What is claimed is:

1. A system for object recognition in an autonomous vehicle, the system comprising:
    non-transitory memory storage comprising instructions and an image feature database; and
    one or more processors in communication with the non-transitory memory storage, wherein the one or more processors execute the instructions to:
        download a road object database associated with a plurality of routes between a departure point and a destination, the road object database including object data for a plurality of fixed objects between the departure point and the destination along the plurality of routes, the object data for each of the fixed objects including location data and image data with a plurality of images of the fixed object;
        receive sensor data from a plurality of sensors of the autonomous vehicle;
        compare the sensor data to the location data and the image data in the road object database to determine if the sensor data is found in the road object database;
        if the sensor data is found in the road object database, identify one or more of the plurality of fixed objects based on the sensor data;
        if the sensor data is not found in the road object database:
            extract features of the plurality of fixed objects using the sensor data;
            format the extracted features into data objects associated with the plurality of fixed objects;
            compare the data objects to data in the image feature database to find the extracted features corresponding to the sensor data and identify the one or more of the plurality of fixed objects in the image feature database; and
            if the sensor data is not found in the image feature database, transmit the sensor data over a wireless channel to an Internet-coupled database to find the sensor data and identify the one or more of the plurality of fixed objects in the Internet-coupled database;
        interpret the sensor data based on at least one of the road object database, the image feature database, or the Internet-coupled database; and
        implement the interpretation with the autonomous vehicle.

2. The system of claim 1, wherein the plurality of sensors comprises one or more of the following:
    an accelerometer, a compass, a gyroscope, an altimeter, a barometer, a thermometer, radar, LIDAR, and GPS receivers, and wherein the plurality of images for each fixed object include images showing different image angles or images taken during different seasons.

3. The system of claim 1, wherein the one or more processors further execute instructions to update one or more of the road object database or the image feature database if the sensor data is not found in the road object database or the image feature database.

4. The system of claim 1, wherein the one or more processors further control streaming of the sensor data between the plurality of sensors and the non-transitory memory storage.

5. The system of claim 1, wherein the system further comprises at least one radio configured to operate over a wireless communication technique comprising one or more of IEEE 802.11 standards, Global System for Mobile communication (GSM), code division multiple access (CDMA), time division multiple access (TDMA), Bluetooth, or Long Term Evolution (LTE).

6. The system of claim 1, wherein the one or more processors further execute instructions to determine possible routes between the departure point and the destination.

7. The system of claim 1, wherein the one or more processors further execute instructions to weight one or more routes differently based on one or more of user preferences, traffic, construction, natural disasters, or weather.

8. The system of claim 1, wherein the one or more processors further execute instructions to download the road object database that comprises one or more of geographical coordinates for roads, intersections, building, or fixed objects between the departure point and the destination.

9. The system of claim 8, wherein the road object database is downloaded for different route and the image feature database is stored in the non-transitory memory storage for all routes.

10. The system of claim 1, wherein the one or more processors further execute instructions to perform a stream query of the road object database by continuously collecting road stream views including sensor data.

11. A computer-implemented method for recognizing road objects by an autonomous vehicle, the method comprising:
    downloading a road object database associated with routes between a departure point and a destination, the road object database including object data identifying a plurality of fixed objects between the departure point and the destination along a plurality of routes, the object data for an object including location data and image data with a plurality of images of the object;

receiving sensor data from a plurality of sensors of the autonomous vehicle;

comparing the sensor data to location data and image data in one of the road object database, an image feature database, or an Internet-coupled database, wherein the sensor data is compared to data in each database in an order of the road object database, the image feature database, and the Internet-coupled database, and the comparing is based at least in part on extracting image features of fixed objects from the sensor data;

interpreting the sensor data based on at least one of the road object database, the image feature database, or the Internet-coupled database; and implementing the interpretation with the autonomous vehicle.

12. The method of claim 11, further comprising determining routes between the departure point and the destination.

13. The method of claim 11, wherein comparing the sensor data to the image feature database comprises:

generating a search object from the extracted image features; and searching the image feature database based on the search object.

14. The method of claim 11, wherein comparing the sensor data to the road object database comprises continuously comparing road images with the road object database.

15. The method of claim 11, wherein implementing the interpretation comprises controlling the autonomous vehicle.

16. A graph-based method for object recognition in an autonomous vehicle, the method comprising:

generating a static database and a streaming database, the static database comprising fixed road objects with associated object metadata for routes between an origin and a destination for the autonomous vehicle, the streaming database comprising sensor streaming data identifying road objects, collected from vehicle sensors, and associated streaming metadata, wherein the object metadata for each of the fixed road objects includes location data and image data with a plurality of images of the fixed road object;

categorizing objects in the static database between fixed objects and temporary objects;

updating the streaming database based on objects from the sensor streaming data as the autonomous vehicle moves;

associating a time and location for the objects from the sensor streaming data; and comparing the streaming database to the location data and the image data from the static database to identify the objects from the sensor streaming data, wherein identifying the objects is based at least in part on extracting image features of fixed objects from the sensor streaming data.

17. The method of claim 16, further comprising:

including associating weather information and road condition information with the object metadata of the fixed road objects in the static database; and classifying people as temporary objects.

18. The method of claim 16, wherein the method further comprising updating the streaming database with updated time and location for the objects from the sensor streaming data.

19. The method of claim 16, wherein the objects from sensor streaming data comprise object data sequences and the method further comprising:

based on an observed object data sequence from the sensor streaming data comprise a different object data sequence length than a corresponding fixed road object data sequence, the associated time and location are used to identify any regions of similarity between the observed object data sequence and the fixed road object data sequence;

determining differences between the observed object data sequence and the fixed road object data sequence; and updating the static database based on the differences between the observed object data sequence and the fixed road object data sequence.

20. The method of claim 16, wherein the objects from the sensor streaming data are sensed by multiple sensors of the autonomous vehicle.

* * * * *

UNITED STATES PATENT AND TRADEMARK OFFICE
CERTIFICATE OF CORRECTION

PATENT NO. : 10,929,462 B2  
APPLICATION NO. : 15/423085  
DATED : February 23, 2021  
INVENTOR(S) : Ren et al.

Page 1 of 1

It is certified that error appears in the above-identified patent and that said Letters Patent is hereby corrected as shown below:

On the Title Page

Column 2, item [56], Line 1, delete "Internatonal" and insert --International-- therefor Signed and Sealed this  
Fourth Day of May, 2021

Drew Hirshfeld  
*Performing the Functions and Duties of the*  
*Under Secretary of Commerce for Intellectual Property and*  
*Director of the United States Patent and Trademark Office*